United States Patent
Ozbaysal et al.

(10) Patent No.: US 10,422,026 B2
(45) Date of Patent: Sep. 24, 2019

(54) PROCESS AND PRODUCT FOR FORMING GAMMA PRIME PRECIPITATION STRENGTHENED SUPERALLOYS

(71) Applicant: Siemens Energy, Inc., Orlando, FL (US)

(72) Inventors: Kazim Ozbaysal, Charlotte, NC (US); Ahmed Kamel, Orlando, FL (US)

(73) Assignee: SIEMENS ENERGY, INC., Orlando, FL (US)

( * ) Notice: Subject to any disclaimer, the term of this patent is extended or adjusted under 35 U.S.C. 154(b) by 710 days.

(21) Appl. No.: 15/140,943

(22) Filed: Apr. 28, 2016

(65) Prior Publication Data

US 2017/0314114 A1    Nov. 2, 2017

(51) Int. Cl.
 C22F 1/10    (2006.01)
 B33Y 10/00   (2015.01)
 (Continued)

(52) U.S. Cl.
 CPC ............. C22F 1/10 (2013.01); B22F 3/1055 (2013.01); B23K 26/0006 (2013.01);
 (Continued)

(58) Field of Classification Search
 CPC ....... C22F 1/10; C22C 1/0491; C22C 1/0433; C22C 19/057; B22F 3/1055;
 (Continued)

(56) References Cited

U.S. PATENT DOCUMENTS 5,156,321 A * 10/1992 Liburdi .................. B22F 7/062
                                              228/119
5,156,697 A * 10/1992 Bourell .................. B22F 3/004
                                              156/272.8

(Continued)

FOREIGN PATENT DOCUMENTS

WO    WO2015096980 A1    7/2015
WO       2016012399 A1    1/2016

OTHER PUBLICATIONS

Bysakh S et al: "Characterization of microstructure in laser-surface-alloyed layers of aluminum on nickel", Metallurgical and Materials Transactions A: Physical Metallurgy and Materials Science Nov. 2003 Minerals, Metals and Materials Society US, vol. 34 A, No. 11, Nov. 2003 (Nov. 2003), pp. 2621-2631.

(Continued)

*Primary Examiner* — Keith Walker
*Assistant Examiner* — John A Hevey

(57) ABSTRACT

A process is disclosed comprising heating a powder mixture (212) with an energy beam (304) to melt only a portion of a first powder (202) of the mixture and to melt all or most of a second powder (204) of the mixture, wherein the second powder includes a gamma prime forming constituent and the first powder includes elements of a desired precipitation strengthened superalloy composition less the gamma prime forming constituent; allowing the melted portions to mix and to cool to form a deposit layer (208) including a beta phase alloy surrounding unmelted first powder of the mixture. The process may further include heat treating the deposit layer to (Continued)

transform it into a gamma plus gamma prime layer (210) of the desired precipitation strengthened superalloy composition.

18 Claims, 3 Drawing Sheets

(51) Int. Cl.
| | |
|---|---|
| *B23K 26/342* | (2014.01) |
| *B23K 26/00* | (2014.01) |
| *C22C 19/05* | (2006.01) |
| *B22F 3/105* | (2006.01) |
| *C22C 1/04* | (2006.01) |
| *B23K 103/08* | (2006.01) |
| *B33Y 70/00* | (2015.01) |
| *B33Y 80/00* | (2015.01) |

(52) U.S. Cl.
CPC ............ *B23K 26/342* (2015.10); *B33Y 10/00* (2014.12); *C22C 1/0433* (2013.01); *C22C 1/0491* (2013.01); *C22C 19/057* (2013.01); *B22F 2998/10* (2013.01); *B23K 2103/08* (2018.08); *B33Y 70/00* (2014.12); *B33Y 80/00* (2014.12); *Y02P 10/295* (2015.11)

(58) Field of Classification Search
CPC .............. B22F 2998/10; B23K 26/342; B23K 26/0006; B23K 2103/08; Y02P 10/295; B33Y 80/00; B33Y 70/00; B33Y 10/00
See application file for complete search history.

(56) References Cited

U.S. PATENT DOCUMENTS

| | | | |
|---|---|---|---|
| 9,352,421 B2* | 5/2016 | Illston | .................. B22F 3/1055 |
| 2012/0100030 A1* | 4/2012 | Green | .................. B22F 3/1039 |
| | | | 419/6 |
| 2015/0050157 A1 | 2/2015 | Ozbaysal et al. | |

OTHER PUBLICATIONS

PCT International Search Report and Written Opinion of International Searching Authority dated Aug. 2, 2017 corresponding to PCT International Application No. PCT/US2017/027092, filed Apr. 12, 2017.

* cited by examiner

PROCESS AND PRODUCT FOR FORMING GAMMA PRIME PRECIPITATION STRENGTHENED SUPERALLOYS

FIELD OF THE INVENTION

This invention relates to the field of metal processing.

BACKGROUND OF THE INVENTION

Nickel-based and cobalt-based superalloy materials are commonly used to provide high mechanical strength for very high temperature applications, such as for the hot gas path components of a gas turbine engine. The design firing temperatures of modern gas turbines continue to increase in order to improve the efficiency of such engines, and new superalloy compositions and processing methods are developed to accommodate these higher temperatures.

The term "superalloy" is used herein as it is commonly used in the art; i.e., a highly corrosion and oxidation resistant alloy that exhibits excellent mechanical strength and resistance to creep at high temperatures. Superalloys typically include a high nickel or cobalt content. Examples of superalloys include alloys sold under the trademarks and brand names Hastelloy, Inconel alloys (e.g. IN 738, IN 792, IN 939), Rene alloys (e.g. Rene N5, Rene 80, Rene 142), Haynes alloys, Mar M, CM 247, CM 247 LC, C263, 718, X-750, ECY 768, 282, X45, PWA 1483 and CMSX (e.g. CMSX-4) single crystal alloys.

Efforts have been made to use additive manufacturing techniques for manufacture as well as repair of superalloy components. In additive manufacturing techniques, a heat source is used to melt a specified amount of metal, which is usually in the form of a powder or wire, onto a base material. By repeating the process and controlling the region of deposition of each layer, layers of melted metallic materials are arranged upon preceding layers, resulting in the formation of a desired component. Additive manufacturing (AM) techniques include selective laser melting (SLM), selective laser sintering (SLS), electron beam melting (EBM), laser metal forming (LMF), laser engineered net shape (LENS), and direct metal deposition (DMD). In the SLM technique, a laser beam scans a layer of powder, thereby melting and solidifying the powder in the areas of contact with the laser beam. Benefits to laser processing are its speed, flexibility, cost, and lead-time reduction potential for manufacturing and reconditioning of components used in today's heavy-duty gas turbines.

The assignee of the present invention produces gas turbine engines utilizing a variety of materials, including blades formed of cast nickel-based superalloy material sold by Cannon-Muskegon Corporation under the designation CM-247 LC. CM-247 LC may have an aluminum content exceeding 5.5%, and is known to have the following nominal composition, expressed as weight percentages: carbon 0.07%; chrome 8%; cobalt 9%; molybdenum 0.5%; tungsten 10%; tantalum 3.2%; titanium 0.8%; aluminum 5.6%; boron 0.015%; zirconium 0.01%; hafnium 1.4%; and the balance nickel.

Elemental additions in nickel base superalloys can be broadly characterized as either gamma formers or gamma prime formers. Gamma formers are for example elements found in Group V, VI, and VII, such as Co, Cr, Mo, W, and Fe. The atomic diameters of these alloys are typically 3-13% different than Ni (the primary matrix element). Gamma prime formers are, for example, elements of Group III, IV, and V such as Al, Ti, Nb, Ta, Hf. The atomic diameters of these elements typically differ from Ni by 6-18%.

Nickel-based alloys can be either solid solution or precipitation strengthened. Previously, solid solution strengthened alloys, such as Hastelloy X, were used in applications requiring only modest strength, while precipitation strengthened alloys have been required for extreme temperature applications, such as hot sections of a gas turbine engine.

Laser additive manufacturing of some high aluminum and/or titanium nickel base alloys is limited. The gamma prime phase in a nickel-aluminum alloy is referred to as $Ni_3Al$ or $Ni_3$ [Al, Ti]. Modern nickel base gamma prime hardened superalloys ("precipitation strengthened" superalloys) may have a volume fraction of 70% gamma prime phase to gamma phase. The gamma (disordered) phase forms a matrix through which the gamma prime (ordered) phase precipitates. As used herein, the term "gamma/gamma prime superalloy" refers to an alloy having a gamma phase matrix in which gamma prime precipitates are embedded. The ordered gamma prime phase present within the gamma matrix acts as a barrier to dislocation motion, thereby strengthening the material. For this reason, this gamma prime phase, when present in high volume fractions, drastically increases the strength of these alloys, and are thus desirable.

Unfortunately, efforts to manufacture workable precipitation strengthened superalloys using laser additive manufacturing have been limited due to incipient cracking which occurs when the superalloy is subjected to laser heating, partial melt, and subsequent rapid cooling. CM-247 LC powder forms gamma/gamma prime superalloy upon cooling from laser heating, but the percentage of gamma prime precipitate that is formed is too high. This results in incipient melting resulting in cracking during cooling, which renders the formed superalloy unsuitable for extreme environments and applications.

Previous work by the present inventors (cited in the inventors' previous United States Patent Application Publication No. US 2015/0050157 A1), including a detailed study of factors affecting weldability of Ni base superalloys and their susceptibility to cracking, has led the present inventors to conclude that a gamma prime phase volume fraction in an amount generally less than about 20-30 wt % is indicative of weldability without unacceptable susceptibility to cracking. A gamma prime content greater than about 60 wt % is generally indicative of nonweldability (that is, susceptibility to strain age cracking) while intermediate gamma prime values typically indicate difficult and expensive welding. Substantially the same conclusions can be drawn for additive or weld build-up processes. That is, a gamma prime phase present in an amount less than about 20-30 wt % is indicative of weld build up without unacceptable susceptibility to cracking. Gamma prime greater than about 60 wt % is generally indicative of weld build up having an unacceptable susceptibility to cracking.

BRIEF DESCRIPTION OF THE DRAWINGS

The invention is explained in the following description in view of the drawings that show.

DETAILED DESCRIPTION OF THE INVENTION

Figure 4:
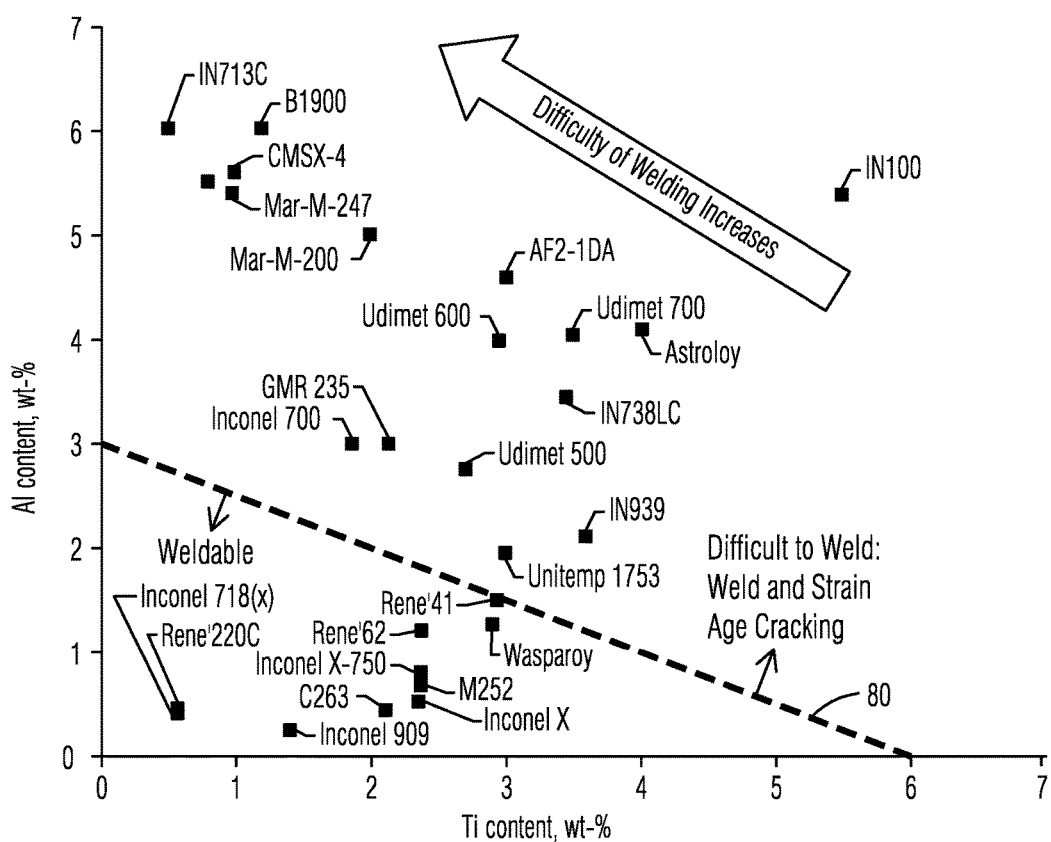
FIG. 4 is a prior art chart illustrating the relative weldability of various superalloys.

Gamma prime precipitation-strengthened nickel-base superalloys with a combined fraction of Al and Ti of more than about 3-6 wt. %, as illustrated in FIG. 4, are known to be very difficult to weld because of their sensitivity to incipient cracking. Cracking during welding of those superalloys is attributed to the liquation of precipitates or low-melting eutectics in the heat affected zone (HAZ), ductility dip cracking (DDC) or strain-age cracking in subsequent heat treatment. It has also been observed that laser additive manufacturing processing of such materials also results in cracking.

In SLM, the laser beam diameter of the laser is small, typically in the range of 100-3000 μm, thereby resulting in a very small melt pool. This leads to rapid solidification once the beam moves to another point on the layer, and corresponding solidification cracking in the metal. Because of this, it was not previously possible to employ standard laser processing methods for producing gamma prime strengthened superalloys.

As mentioned previously, CM-247 LC has an aluminum content of around 5% by weight. Because of this aluminum content, CM-247 LC was not previously considered a candidate alloy for standard laser manufacturing processes. While the gamma/gamma prime phase could be formed, the metal would suffer incipient cracking during cooling due to several factors, one of which was the high percent of gamma prime precipitates that form when the nickel-aluminum alloy is heated with a laser and left to cool.

Figure 1:
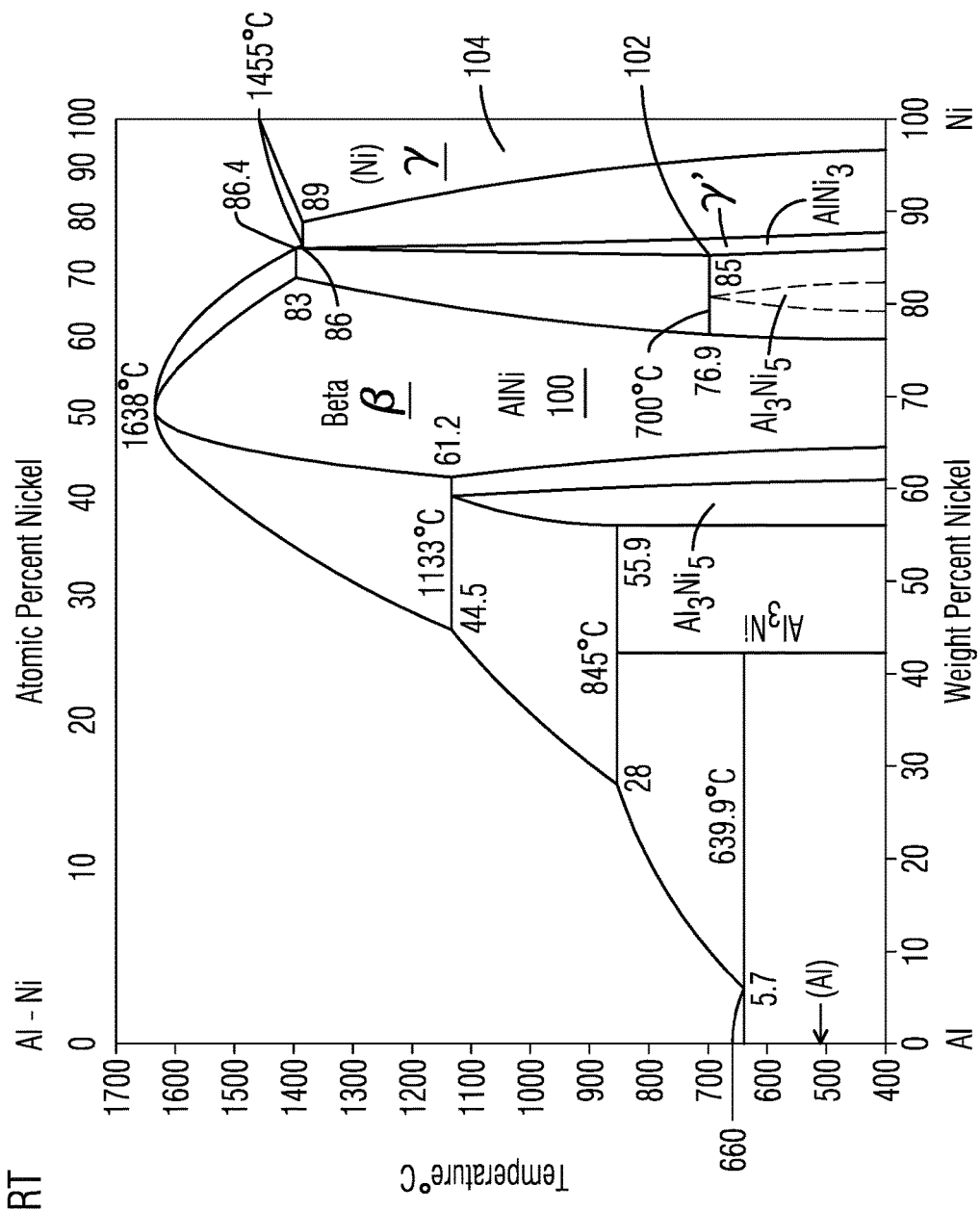
FIG. 1 is a known phase diagram of a nickel-aluminum alloy.

FIG. 1 is a binary phase diagram of a nickel-aluminum alloy showing various phases and the conditions under which the various phases exist. The form of nickel-aluminum alloy that is of most interest here are those which have both gamma and gamma prime phases, which are shown on the phase diagram as 104 and 102, respectively. The beta NiAl phase is shown as 100 in FIG. 1. The beta NiAl phase has an ordered body centered cubic (BCC) structure. It does not have the strength of gamma / gamma prime counterparts. The beta form is present at high temperatures when the atomic percent aluminum is around 50%, or between about 23-35% by weight. (It should be noted that while the nickel-aluminum phase diagram of FIG. 1 is a binary system, the binary Ni—Al phase diagram is used to approximate phases in nickel-aluminum based alloys having more than two elements, such as CM-247 LC).

The inventors have recognized that phases other than gamma/gamma prime are less brittle and are less prone to cracking when heated with a laser and left to cool. An example is the beta NiAl phase. The inventors have further recognized that processing of nickel-aluminum alloys may be manipulated so as to exploit the tolerance of the beta NiAl phase to laser processing. As disclosed below, the inventors have discovered methods to induce the formation of a beta NiAl phase using laser additive manufacturing, and then subsequently heat treating this phase to diffuse a concentration of the gamma prime forming element in order to produce a gamma/gamma prime superalloy, thereby avoiding the rapid cooling and subsequent cracking of a gamma prime rich phase. As will be explained further below, advantages of the methods disclosed are that they allow for a gamma/gamma prime superalloy to ultimately be formed using a laser additive manufacturing process, yet having reduced or no incipient cracking. These processes are described in more detail below.

Figure 2A:
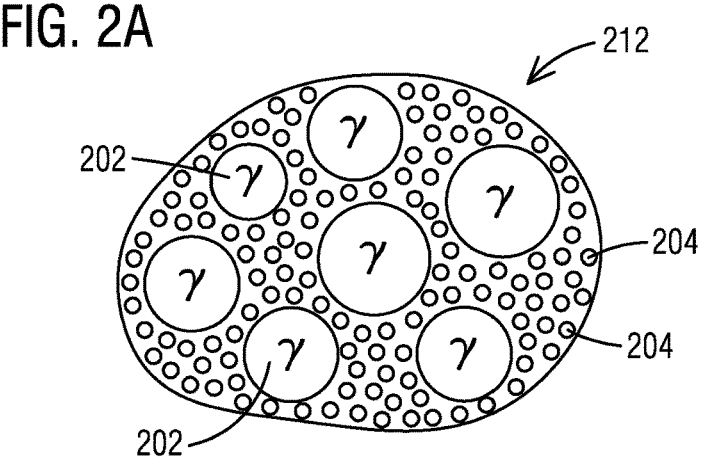
FIG. 2A shows a mixture of powders for use in a laser additive manufacturing process, in accordance with an embodiment of the invention.
Figure 2B:
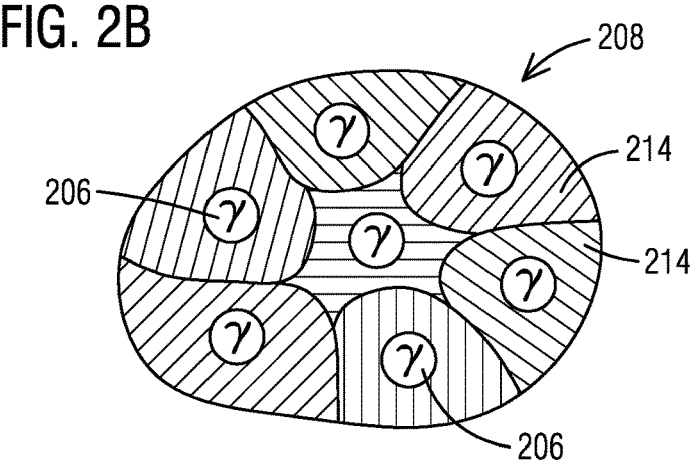
FIG. 2B shows a deposit layer of metals formed by heating of the mixture of powders of FIG. 2A with an energy beam and having present both beta and gamma phases.
Figure 2C:
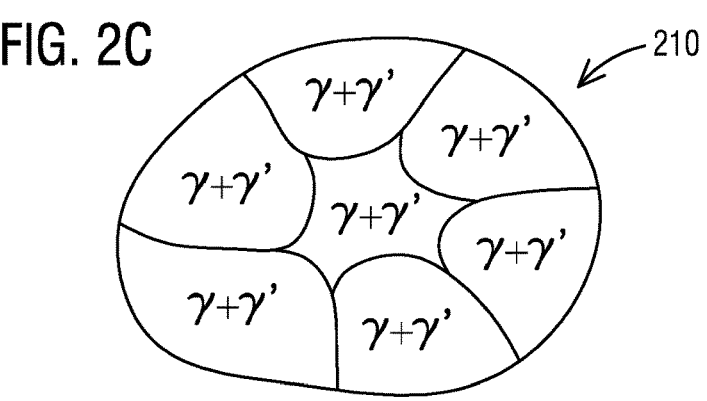
FIG. 2C shows a gamma/gamma prime alloy formed by heat treating the deposit layer of FIG. 2B.

FIGS. 2A-2C are illustrative of an example process for forming a gamma/gamma prime alloy 210, as well as the compositions used in various stages of the process. The gamma/gamma prime alloy 210 may be a superalloy such as CM-247 LC in an embodiment. The first step involves selecting and mixing two powders into a powder mixture 212. These powders are shown in FIG. 2A and include a first powder 202 (referred to as "Powder A"), and a second powder 204 (referred to as "Powder B"). This mixture of Powder A and Powder B is shown at reference numeral 212. The particle sizes of Powder A and Powder B differ in that their relative nominal diameters may vary by a ratio of 3:1 or more. In other words, the particle size of Powder A may be larger, or at least 3 times larger in some embodiments, than the particle size of Powder B, for reasons discussed further below.

In an embodiment, Powder A is composed of the elements of a given superalloy absent all or some of the element(s) known to be gamma prime forming constituents, such as aluminum. The gamma prime forming constituents may be completely absent, or they may be in a lower concentration than that of the given superalloy, or they may exist in only low or trace quantities. In embodiments, Powder A may be composed of the elements of a given superalloy in the gamma phase with less than 1.0 wt % gamma prime forming constituents. In an embodiment, Powder A is a nickel base alloy in the gamma phase and Powder B is aluminum powder, (which may contain insubstantial and unavoidable trace elements). If the desired superalloy to be formed is CM-247 LC, the composition of Powder A includes elements found in CM-247 LC, less aluminum.

In the next step of the process, the powder mixture 212 is heated with an energy beam 304, which may be a laser beam. The parameters of the laser are such that the larger Powder A particles are only partially melted (at their surface), while the smaller Powder B particles are fully melted, or are substantially or at least partially melted. Having a particle size ratio 3:1 of Powder A to Powder B facilitates the preferential melting of Powder B. In embodiments where Powder B is aluminum, the relatively lower melting temperature of Powder B compared to Powder A also facilitates the preferential melting of Powder B.

Upon laser heating, a small amount of Powder A melts and mixes with the melted Powder B to form a gamma plus beta alloy. Alloy 214 is a combination of (1) aluminum formed from the melted Powder B 204 and (2) a small amount of elements which melted from Powder A. In embodiments, alloy 214 has between 25-45 wt. % aluminum. In other embodiments, alloy 214 has between 25-35 wt. % Al at room temperature. In embodiments, alloy 214 is a beta phase nickel aluminum base alloy. When referring to the "beta" phase of alloy 214, reference is made to a range of compositions which are substantially free of other phase constituents (i.e. minor amounts such as less than 5 volume % of other phases may occur in the microstructure).

Advantages of forming alloy 214 is that the beta phase does not form a low melting point eutectic with gamma (as gamma prime does) and therefore is more resistant to cracking when the laser moves away from the melt pool, leaving it to rapidly cool. Therefore, the present methods improve over laser additive manufacturing using CM-247 LC powder itself. If powder of CM-247 LC alloy were laid atop a substrate and subjected to a laser additive manufacturing process, the CM-247 LC would melt and quickly resolidify, forming a gamma-gamma prime eutectic and resulting in incipient cracking. In contrast, alloy 214 is much less prone to solidification and grain boundary liquation cracking during rapid cooling.

Together, alloy 214 and the remaining Powder A 206 form the deposit layer of mixture 208. Mixture 208 has (1) solid Powder A particles 206 which never melted and therefore remain in gamma phase, and (2) alloy 214 (which is predominantly beta phase NiAl in embodiments). Note that the Powder A particles 206 of FIG. 2B have the same composition as Powder A particles 202 of FIG. 2A, however, they are shown with different reference numerals to account for the smaller size of Powder A particles 206, due to loss of mass following their partial melting.

While the laser passes over the powders, mixture 208 will be a mixture of (1) molten aluminum comingled with a small amount of molten metal of Powder A and (2), the portions of Powder A particles which remain solid. Because cooling occurs rapidly, once the laser moves away from the melt pool, the melted portions will solidify. The molten aluminum comingled with the small amount of molten metal of Powder A will solidify into the beta alloy 214. Embedded in the beta alloy 214 matrix are the portions 206 of Particle A which remained solid.

As shown in FIG. 2B, mixture 208, once solidified as a deposit layer, is a product which may subsequently be heat treated at a temperature below its incipient melting point to diffuse the gamma prime forming element (e.g. aluminum) to form a gamma/gamma prime superalloy 210 as shown in FIG. 2C. Mixture 208 may be formed as a layer upon a surface of a product being repaired, or it may be formed as an end product itself to be used in a subsequent manufacturing or repair process. Mixture 208 may be formed into a desired shape by known manufacturing processes, such as machining or grinding, etc. Mixture 208 may be transformed into a homogeneous precipitation strengthened superalloy 214 of FIG. 3C by a heat treatment conducted solely for that purpose, or by use of the material in a high temperature environment over time.

It is upon cooling from the solid state heat treatment that a gamma/gamma prime superalloy is formed. The significance of the mixture 208 is that it is has both gamma and beta phases of nickel based alloys. This is advantageous because mixture 208 can be subjected to solid state heat treatment to form a gamma/gamma prime superalloy, such as CM-247 LC, however without incipient cracking problems mentioned previously. This is a departure from and an advantage over previous art, as typically high strength materials are cold worked or strain hardened to reach a high degree of hardness, whereas strengthening by solid state heat treatments were previously reserved for materials where only modest strength was needed.

As previously mentioned, incipient cracking is attributed to the liquation of precipitates or low-melting eutectics. The present process is advantageous because a beta/gamma/liquid phase eutectic does not exist. By subjecting the mixed beta/gamma phase starting material (mixture 208) to solid state heat treatment, the resulting gamma/gamma prime alloy 210 forms below the eutectic temperature. Because of this, cracking issues are avoided. Likewise, the remaining solid Powder A (206) does not undergo solidification cracking, because it never melted in the first place (solidification cracking occurs when a liquid phase solidifies). During solid state heat treatment, atoms of the remaining Powder A 206 diffuse and mix with alloy 214 to result in alloy 210.

If the desired alloy is superalloy is CM-247-LC, then Powder A may be powder of an alloy having the elements present in CM-247 LC, less aluminum (a gamma prime former) and Powder B may be substantially aluminum. In embodiments, Powder A may also include elements other than aluminum, as powdered aluminum is explosive.

Solid solution heat treatment of the gamma/beta mixture 208 is kept below the incipient melting point and is adjusted to diffuse aluminum completely within the remaining Powder A, and allow for the formation of gamma prime precipitates. If the gamma/gamma prime superalloy desired is CM-247 LC, Powder A may include elements of CM-247 LC, absent all but trace aluminum, or having less than 0.1 wt. % aluminum for example. Alternatively, Powder A includes elements of CM-247 LC, but with no more than 1.0 wt. % of gamma prime forming constituents, as above this weight percent cracking is more likely to occur. The solution heat treatment of mixture 208 then operates to diffuse aluminum into Powder A, so as to result in a homogenous overall composition of CM-247 LC. In embodiments, conditions are chosen so as to produce equilibrium amount of gamma prime formation following the heat treatment. In other embodiments, the superalloy formed has a volume fraction of gamma prime phase to gamma phase of less than 30 wt %.

The process may be used to repair, reshape, and clad superalloy components. In embodiments, the process is a laser additive manufacturing process. For example, a base alloy substrate may need to be repaired by adding an extra deposit layer of a certain alloy on its surface. In this instance, Powder A and Powder B are placed on the surface of the substrate, heated with a laser to form a deposit layer (the gamma/beta mixture 208) on the surface of the base alloy, and solution treated to transform mixture 208 into a gamma/gamma prime layer of the desired precipitation strengthened superalloy composition.

Figure 3:
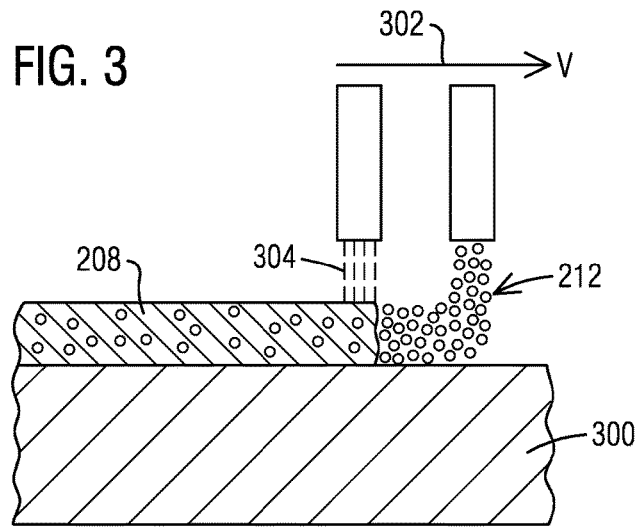
FIG. 3 shows a process for additive manufacturing using an energy beam, in accordance with an embodiment of the invention.

FIG. 3 shows a process whereby Powder A 202 and Powder B 204 (collectively the powder mixture 212) are placed on a substrate 300. The powder mixture 212 may be pre placed or deposited just in front of an energy beam 304 (or other directed energy such as plasma, laser, electron beam, etc.), moving along the direction 302 with velocity V. The beam power may be adjusted so that a relatively small amount of dilution with the base metal occurs when Powder B is melted and Powder A is partially melted. This is so as to produce a smaller heat affected zone (HAZ) and reduce HAZ cracking that can occur when the laser interacts with a base material. Preplacing the powder mixture 212 may help to mitigate the fully intense laser beam 304 from interacting with the substrate 300 base metal and causing a large HAZ. Another advantage is that the presence of Powder B, when interacting with the laser and the substrate, may form gamma phases at the surface of the substrate, thus reducing the chances of cracking of the substrate as well. The powder mixture 212 may be mixed in a number of ways and is not necessarily a homogenous mixture of Powder A and Powder B. Moreover, the powder mixture or the individual powders may be pre-heated.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. A process comprising:
   heating a powder mixture to melt only a portion of a first powder of the mixture and to melt all or at least a portion of a second powder of the mixture;
   wherein the second powder comprises a gamma prime forming constituent and the first powder comprises elements of a desired precipitation strengthened superalloy composition less the gamma prime forming constituent; and
   allowing the melted portion of the first powder and the melted portion of the second powder to mix and cool to form a deposit layer comprising a beta phase alloy encasing an unmelted portion of the first powder of the mixture.

2. The process of claim 1, further comprising heat treating the deposit layer to transform it into a gamma plus gamma prime layer of the desired precipitation strengthened superalloy composition.

3. The process of claim 2, wherein the precipitation strengthened superalloy composition has an aluminum content greater than 3 wt. %.

4. The process of claim 2, wherein the precipitation strengthened superalloy composition has an aluminum content greater than 5 wt. %.

5. The process of claim 1, wherein the superalloy composition is CM-247 LC.

6. The process of claim 1, wherein the first powder and second powder have a powder particle size ratio of at least 3:1.

7. The process of claim 1, where the powder mixture is heated with an energy beam.

8. The process of claim 7, wherein the energy beam is a laser beam.

9. A process comprising:
   mixing a first powder comprising a gamma phase alloy having less than 0.1 wt. % Al with a second powder comprising aluminum;
   heating the first powder and second powder such that only a portion of the first powder melts and mixes with the second powder which melts completely; and
   allowing the mixed melted materials to cool and to solidify to form a deposit layer comprising a beta phase matrix material surrounding unmelted first powder gamma phase alloy.

10. The process of claim 9, further comprising solution heat treating the deposit layer to diffuse the beta phase matrix material into the gamma phase alloy to form a gamma plus gamma prime precipitation strengthened superalloy.

11. The process of claim 9, wherein a nominal diameter of particles of the first powder is at least three times a nominal diameter of particles of the second powder.

12. A process comprising providing a powder mixture including a first powder and a second powder, melting only a portion of the first powder and all of the second powder with an energy beam such that, upon cooling and solidification, a deposit layer is formed comprising a matrix of beta phase material surrounding particles of a gamma phase material.

13. The process of claim 12, further comprising heat treating the deposit layer to transform it into a homogeneous gamma plus gamma prime superalloy composition.

14. The process of claim 12, wherein the second powder comprises a gamma prime forming constituent that is fully melted in the melting step.

15. The process of claim 12, wherein the first powder and second powder have a powder particle size ratio of at least 3:1.

16. The process of claim 13 wherein the
   first powder includes elements of the homogeneous gamma plus gamma prime superalloy composition but has less than 0.1 wt. % aluminum; and
   the second powder includes aluminum.

17. The process of claim 16, wherein the homogeneous gamma plus gamma prime superalloy composition is alloy CM-247 LC, and the first powder comprises elements of CM-247 LC absent all but trace aluminum.

18. The process of claim 13 wherein the
   first powder includes elements of the homogeneous gamma plus gamma prime superalloy composition but has no more than 1.0 wt. % of gamma prime forming constituents; and
   the second powder includes gamma prime forming constituents.

* * * * *